UNITED STATES PATENT OFFICE.

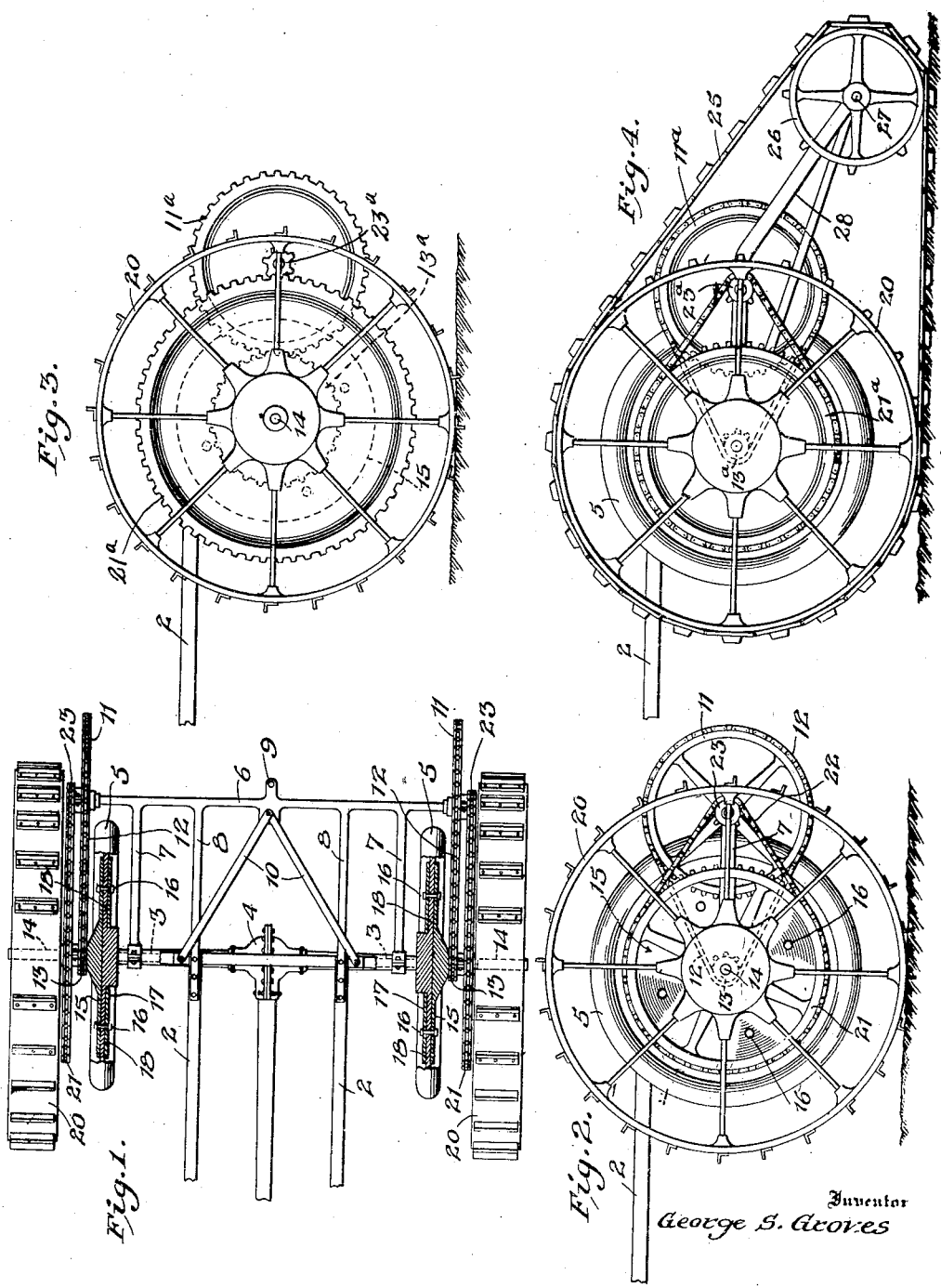

GEORGE S. GROVES, OF MOUNT IDA, VIRGINIA.

TRACTOR UNIT.

1,337,905.  Specification of Letters Patent.  Patented Apr. 20, 1920.

Application filed February 15, 1919. Serial No. 277,261.

*To all whom it may concern:*

Be it known that I, GEORGE S. GROVES, a citizen of the United States, residing at Mount Ida, in the county of Alexandria and State of Virginia, have invented certain new and useful Improvements in Tractor Units; and I do hereby declare the following to be a full, clear, and exact description of the invention, such as will enable others skilled in the art to which it appertains to make and use the same.

This invention relates to tractor engines or like vehicles and pertains especially to a unit gear adapted to be attached to an automobile or gas engine or otherwise suitably driven motor vehicles.

It is the object of the present invention to provide a simple and practicable and substantial unit provided with gear sets all in one organization and especially to provide such a working gear set and unit as will be readily attachable to various types of automobiles and gas engine propelled vehicles such as the Ford type of self-propelled vehicles. A further object of the present invention is to provide an organization gear unit for readily converting a motor propelled vehicle of the pleasure or truck type into a traction vehicle attachable for hauling heavy loads and especially useful for plowing and other agricultural purposes. A further object of the invention is to provide a converting unit which may be attached to the usual wheels of the self-propelled vehicle without requiring the dismantling or mechanical change thereof and which, at the same time, is designed to elevate the usual driven wheels of the vehicle to a plane out of contact with the roadway or other surface and to provide a pair of traction wheels which are adjustable upon the motor vehicle so as to be coaxially arranged with the usual driving wheels.

With these and other objects in view as will be rendered manifest to those versed in the art the invention consists of the construction, the combination, and in details and arrangements of the parts as more particularly disclosed in the following specification with the relation to the embodiments of the invention illustrated in the accompanying drawings wherein Figure 1 is a plan view of the rear portion of the chassis of a self-propelled vehicle as of the Ford type and to which the unit for converting it into a tractor is shown attached. Fig. 2 is a side elevation of the unit shown in Fig. 1. Fig. 3 is a slightly modified form of the transmitting mechanism between the usual wheels of the vehicle and the attached tractor wheels. Fig. 4 is a side elevation showing a slightly modified form of the invention in which there is provided an endless traveling traction platform or belt.

In the embodiment of the invention illustrated in Figs. 1 and 2, a portion of the frame of a motor vehicle is indicated at 2 and carries or is mounted upon a transverse axle 3 in which is mounted a differential gear 4 the driven shafts in the axle 3 being provided with the usual pneumatic or otherwise tired wheels 5—5.

The present invention resides in the connection to the vehicle frame and the wheels of a unit organization comprising essentially a transversely disposed rigid bar or axle 6 having forwardly extending arms or elements 7—7 attachable by any suitable means to the axle 3 and which transverse and rearwardly disposed axle or bar 6 is also provided with forwardly extending arms 8 designed to be rigidly and suitably secured to the vehicle frame 2. The central portion of the transverse bar or axle 6 is provided with a coupling device at 9 to which there may be attached any suitable vehicle or implement to be drawn by the converted tractor. To give the desired rigidity to the central portion of the rear axle or bar 6 a suitable bracing means as the diagonal braces 10—10 may be extended forwardly and connected to the frame in the manner indicated.

For the purpose of utilizing a maximum tractive effort of the vehicle engine suitable reduction gears are mounted upon the unit and are shown in Figs. 1 and 2 as comprising sprocket wheels 11—11, loosely mounted on trunnions on the ends of the axle or bar 6, the sprockets 11 having sprocket chains 12 which extend forwardly and engage with pinions 13 fastened on spindles 14 extending outwardly from respective side of plates or clamping means 15 here shown as in the form of plates through which are passed bolts 16 engaging a parallel clamping means as for instance a disk or spoke plate 17 arranged against the inside of the wheel 5 and upon the spokes 18 thereof. It will be seen therefore that when the motor vehicle wheels 5 are driven the clamping means 15—16 serve to rotate the sprocket wheel 13. Mounted on the spindle 14 extending outwardly from each wheel 5 there is shown a suitable type of traction wheel 20 on the inside face of which there is secured or formed a sprocket wheel 21 from which runs rearwardly a sprocket chain 22 engaging a pinion 23 which is fixed to the master sprocket 11 so that rotation of the vehicle wheels 5 drives the pinion 13 and thereby the master sprocket 11 and from them by means of pinions 23 the large sprocket wheels 21 are secured to their respective traction wheels 20. From this it will be seen that I have provided an extremely simple, inexpensive, practicable and substantial organized unit, readily attachable to any desired type or form of motor-driven vehicles such for instance as Fords.

In Fig. 3 there is shown a slightly modified form of the transmitting mechanism comprising a pinion 13ª secured by the fastening clamp or member 15 to the wheel 5, this pinion engaging a complementary gear 11ª to which is secured a pinion 23ª engaging a large gear 21ª fast on the traction wheel 20.

A further modified form of the traction elements is illustrated in Fig. 4 in which the traction wheel 20 is provided with a toothed perimeter over which runs an endless traction belt 25 which extends rearwardly to and around an idler 26 mounted on a shaft or journal 27 carried in a suitable frame 28 of the unit structure. In this modification the driving mechanism is essentially the same as that shown in Figs. 1 and 2.

What I claim is—

1. A unit organization for converting automobiles into tractors, comprising a draft bar or rod with journals on its ends; traction means including main wheels attachable co-axially to the drive wheels of the vehicle; and reduction gear mechanism connecting the traction means and the drive wheels and including intermediate gears on the journals, the unit having connecting means between the rod and the chassis gear, said traction means including rear idler wheels and endless belts running between respective idlers and the said main wheels.

2. In a device of the type described the combination with an automobile of a tractor unit for attachment thereto comprising wheels attachable to the drive wheels of the automobile, reduction gearing connecting the wheels of the tractor unit and said drive wheels, a rearwardly extending frame secured to the frame and rear construction of the automobile, idler wheels mounted on said frame, and endless traction belts running between the wheels of said tractor unit and said idler wheels.

In testimony whereof I affix my signature.

GEORGE S. GROVES.